United States Patent [19]

Sibley et al.

[11] Patent Number: 5,066,145

[45] Date of Patent: Nov. 19, 1991

[54] SOLID-LUBRICATED BEARING ASSEMBLY

[75] Inventors: Lewis B. Sibley, Paoli; C. Brian Kelly, Secane, both of Pa.

[73] Assignee: Tribology Systems, Inc., Paoli, Pa.

[21] Appl. No.: 374,167

[22] Filed: Jun. 29, 1989

[51] Int. Cl.[5] .................... F16C 33/66; F16C 33/60
[52] U.S. Cl. .................... 384/463; 384/499; 384/13
[58] Field of Search .............. 384/13, 50, 445, 449, 384/456, 462, 463, 469, 499, 543, 546, 569–571, 606, 907, 907.1

[56] References Cited

U.S. PATENT DOCUMENTS

| | | | |
|---|---|---|---|
| 2,785,023 | 3/1957 | Naumann | 384/469 |
| 3,675,978 | 7/1972 | McKelvey | 384/463 |
| 3,782,795 | 1/1974 | Richey et al. | 384/463 |
| 4,323,288 | 4/1982 | Smith, Sr. et al. | 384/449 |

FOREIGN PATENT DOCUMENTS 72917 4/1988 Japan ................. 384/462
225730 9/1988 Japan ................. 384/462

*Primary Examiner*—Thomas R. Hannon

[57] ABSTRACT

A solid-lubricated bearing assembly comprising an outer bearing member having a generally radially inwardly facing race surface formed therein adapted to receive rotatable bearing elements for rotating motion of said rotatable bearing elements respecting said outer bearing member, an inner bearing member having a generally radially outwardly facing race surface formed therein adapted to receive said rotatable bearing elements for rotating motion of said rotatable bearing elements respecting said inner bearing member, a plurality of said rotatable bearing elements retained between said race surfaces of said inner and outer bearing members, and solid lubricant material biased against and contacting at least one of said rotatable bearing elements for depositing a film of said solid lubricant material on said rotatable element by contact therewith as said rotatable elements rotate against said race surfaces.

30 Claims, 4 Drawing Sheets

SOLID-LUBRICATED BEARING ASSEMBLY

BACKGROUND OF THE INVENTION—FIELD OF THE INVENTION

This invention relates generally to bearings and specifically to ball, roller and sleeve bearings having solid lubricants, which can operate in adverse environments for long times without necessity of repeated application of lubricating oil or grease.

DESCRIPTION OF THE PRIOR ART

Ball, roller and sleeve bearings are known and have been used in mechanical devices essentially since the beginning of the industrial revolution. While such bearings are serviceable in wide variety of applications and environments, these conventional bearings have some disadvantages. One major disadvantage is the need for lubricating oil or grease to provide adequate lubrication between the moving surfaces, so that friction does not cause the bearings to overheat and self-destruct during operation.

Conventional petroleum-based oil and grease lubricants tend to dry out and/or evaporate over time and generally must be replaced periodically for the bearing to function adequately over its design life. To perform such lubrication, workers require access to the bearings; this means downtime for the associate machinery.

Feasibility of solid-lubricated bearings has been demonstrated, but adequately reliable solid lubricated, high temperature bearing systems do not exist, even though such systems would reduce maintenance and increase permissible operating temperatures and reliability of the associated machinery.

In conceptualized but presently insufficiently developed solid lubricated bearing systems, lubricating films at the surfaces which are in rolling and/or sliding contact must be replenished by transfer films from reservoirs built into the bearing system, since a sufficiently thick solid lubricant film (to provide a reasonably long bearing life) cannot be initially deposited on the contacting surfaces without excessively disturbing bearing internal geometry. Some conceptualized designs have envisioned powdered lubricants suspended as a smoke in a gas to provide the required film replenishment. Such smokes are very difficult to pump into and to scavenge from the bearings without excessive agglomeration and clogging.

Use of solid lubricants and dry, wear-resistant materials in low and high temperature bearing applications has been attempted, using molybdenum disulfide, graphite and Teflon. The bearing industry markets several types of dry bearing materials based on such molybdenum disulfide, graphite, Teflon and other plastics to be used as solid lubricants. Woven glass fiber-reinforced Teflon bearings ar fabricated by bonding a stiff metal backing to a thin composite layer of soft (but solid) lubricating Teflon, reinforced with a hard glass fabric so that very thin film of Teflon lubricates the glass fibers with a minimum of deflection, plastic flow and wear.

Conventional petroleum-lubricated ball bearing-equipped material handling system trolleys are illustrated in the brochure "Ball Bearing Trolleys" published by FMC Corporation, booklet 710105, available from the FMC Corporation Material Handling Systems Division in Chalfont, Pa.

In some applications, it is desirable to have electrical conductivity between the inner and outer bearing races. Conventional oil or grease lubricated bearings typically are not electrically conductive. Generally the lubricating oil or grease, especially if petroleum-based, is electrically insulative. When a thin film of lubricating oil or grease resides on the bearing surfaces, the thin film electrically insulates the contacting surfaces from one another.

One application in which electrically conductive bearings are necessary is electrostatic spray painting. In many industries, parts to be electrostatically spray painted are suspended from trolleys traveling along elevated tracks. A charge is applied to the objects to be painted by applying electrical charge to the elevated track on which the trolleys, carrying the objects, travel. To impart the charge to the objects, an electrically conductive path must be provided from the track through the trolley to the object to be painted.

In known electrostatic spray painting systems, the limiting factor in providing an electrically conductive path to the object to be painted is electrical resistance between the moving surfaces of the bearings which are part of the electrically conductive path between the trolley wheel and frame. This resistance results from the electrically insulative lubricating oil or grease film on bearing surfaces.

Bearings conventionally used in applications requiring electrical conductivity have a major disadvantage: when the electrically insulative lubricating oil or grease film is between the moving surfaces of the bearing, arcing occurs across the film, between the surfaces. This arcing pits the case-hardened metal surfaces, leading to early failure of the metal surfaces and consequent failure of the bearing.

One approach to providing an electrically conductive bearing has been to equip conventional bearing assemblies with a sliding contact finger riding on or structurally connected to the trolley load-carrying structural member affixed to the inner race of the assembly. The contact finger slides along the track on which the trolley assembly rides, to provide an electrically conductive path between the track and the trolley carrying the object to be painted by electrostatic spray painting. This approach has not been successful.

In known, empirically designed solid lubricated bearing applications, sporadic catastrophic bearing failures occur. Reliable, self-contained, solid lubricated bearings are needed to provide the advantages of reduced maintenance and higher operating temperatures that can greatly improve performance and fuel efficiency of machines.

SUMMARY OF THE INVENTION

This invention provides solid-lubricated ball, roller and sleeve bearing assemblies requiring essentially no conventional lubrication or maintenance. The invention provides a new and improved approach for advanced high-temperature solid lubricants and lubrication concepts for ball, roller and sliding bearings.

In one of its aspects, the invention includes an outer bearing ring, an inner bearing ring (with the inner and outer bearing rings including races for retaining balls or rollers of the bearing assembly), a plurality of balls or rollers journaled for rolling contact with respective races of the outer and inner bearing rings and a solid lubricant member biased against one or more of the balls or rollers journaled between the inner and outer rings, with the inner and outer rings connected to load-applying or load-carrying members.

The lubricating member is preferably carbon graphite and is preferably biased against the bearing balls, rollers or other moving surfaces so that the graphite "writes on", i.e. rubs against, the bearing balls, rollers or other moving surface(s), leaving a thin graphite lubricating film thereon. As the bearing operates, the graphite film is carried by the rotating balls or rollers to the race surfaces against which the balls or rollers are journaled so that a graphite film forms (between the balls or rollers and the race surfaces) and desirably remains in place for the life of the bearing, without subsequent need to apply additional lubricant.

The lubricating member is preferably in the form of a ring fabricated to have an outer diameter slightly larger than a circle defined by regions of contact between the lubricating ring and the bearing balls or rollers. As a result, the lubricating ring is preferably slightly compressed, i.e. radially inwardly flexed, when installed. This inward compression causes the lubricating ring to flex outwardly against the balls or rollers, thereby ensuring good contact between the lubricating ring and the balls or rollers over the life of the bearing, as the ring endeavors to return to its unflexed state. This action desirably continuously replenishes the lubricant film as the bearing operates. The lubricating ring is preferably fabricated with an overlap joint facilitating radially inward flexure when the ring is installed.

In a second aspect, the invention embraces a sleeve bearing in which a solid lubricant, preferably in the form of a ring, may be in the sleeve and biased inwardly against a member moving within the sleeve.

In the sleeve bearing aspect of the invention, the solid lubricant may alternatively be within the member moving within the sleeve. In such cases the lubricant material is biased outwardly against the sleeve. A solid lubricant film forms on the moving surfaces, eliminating further need for application of lubricant over the useful life of the bearing.

In all instances, position of the solid lubricant may vary depending on the application in which the bearing is used.

While carbon, appropriately bound together with known binders and optionally including one or more known lubricant additives, such a molybdenum sulfide, is the presently preferred material for the solid lubricant, other candidate materials include second generation complex metal chalcogenides which are specially adapted for high-temperature bearing performance. These new solid lubricant material formulations, like the presently preferred bound carbon, can be incorporated into self-contained solid-lubricant compacts and coatings and designed into the advanced design bearings of the invention.

DESCRIPTION OF THE PREFERRED EMBODIMENTS AND BEST MODE KNOWN FOR PRACTICING THE INVENTION

Figure 1:
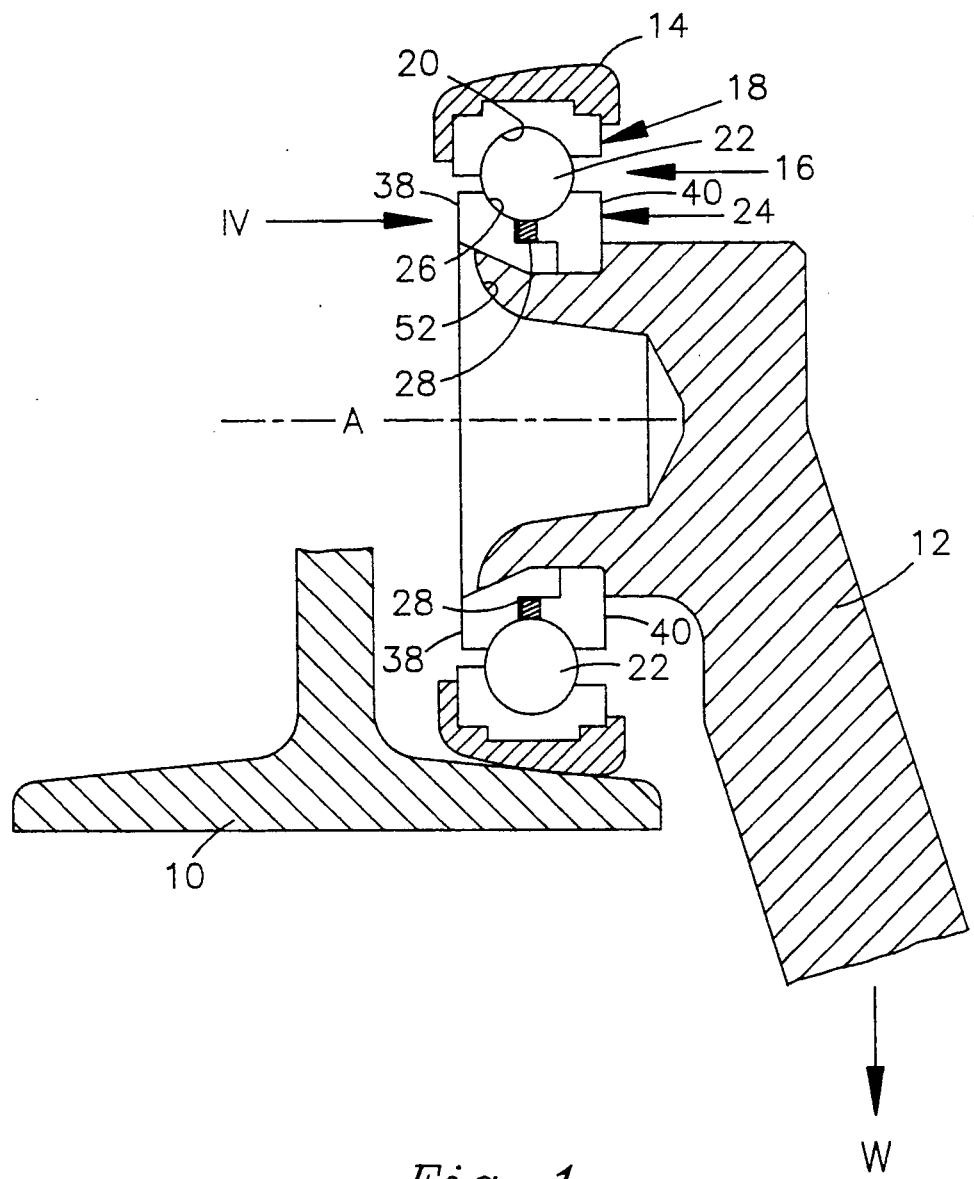
FIG. 1 is a vertical section schematically illustrating a ball bearing assembly manifesting aspects of the invention.

Referring to FIG. 1, (and FIGS. 6 and 7) a material handling system trolley (not shown) has a wheel 14 riding on a rail 10. A trolley load-carrying member 12 is transported by trolley wheel 14, in order that the trolley may carry a load as wheel 14 moves along rail 10. The rail 10, the trolley load carrying member 12 and wheel 14 are all shown in section. An arrow W denotes a load carried by the trolley.

A bearing assembly denoted generally 16 (116, 216) facilitates rotary motion of wheel 14 with respect to trolley load-carrying member 12 as the trolley moves along rail 10. Bearing assembly 16 (116, 216) is solid-lubricated and, in the embodiment shown, includes an outer bearing member 18, (118, 218) an inner bearing member 24 (124, 224) and a plurality of rotatable bearing elements 22 (122, 222). Outer bearing member 18 (118, 218) is generally ring-like, as is inner bearing member 24 (124, 224). An inwardly facing race surface 20 (120, 220) is formed in outer bearing member 18 (118, 218). A corresponding outwardly facing race surface 26 (126, 226) is formed in inner bearing member 24 (124, 224). Race surfaces 20 (120, 220), 26 (126, 226) are configured to receive and to facilitate rotation of bearing elements 22 (122, 222) with respect to race surfaces 20 (120, 220), 26 (126, 226) thereby permitting exceedingly low friction rotary motion of inner bearing member 24 (124, 224) with respect to outer bearing member 18 (118, 218).

When bearing elements 22 are balls, as illustrated in FIG. 1, inwardly facing race surface 20 and outwardly facing race surface 26 typically are arcuate, with constant radii of curvature, to facilitate rotation of bearing elements 22 with respect to race surfaces 20, 26. When bearing elements 22 are rollers, as illustrated in FIG. 6, inwardly facing race surface 20 and outwardly facing race surface 26 are preferably planar in at least one direction, to facilitate rotation of the rollers with respect to outer bearing member 18 and inner bearing member 24.

Figure 6:
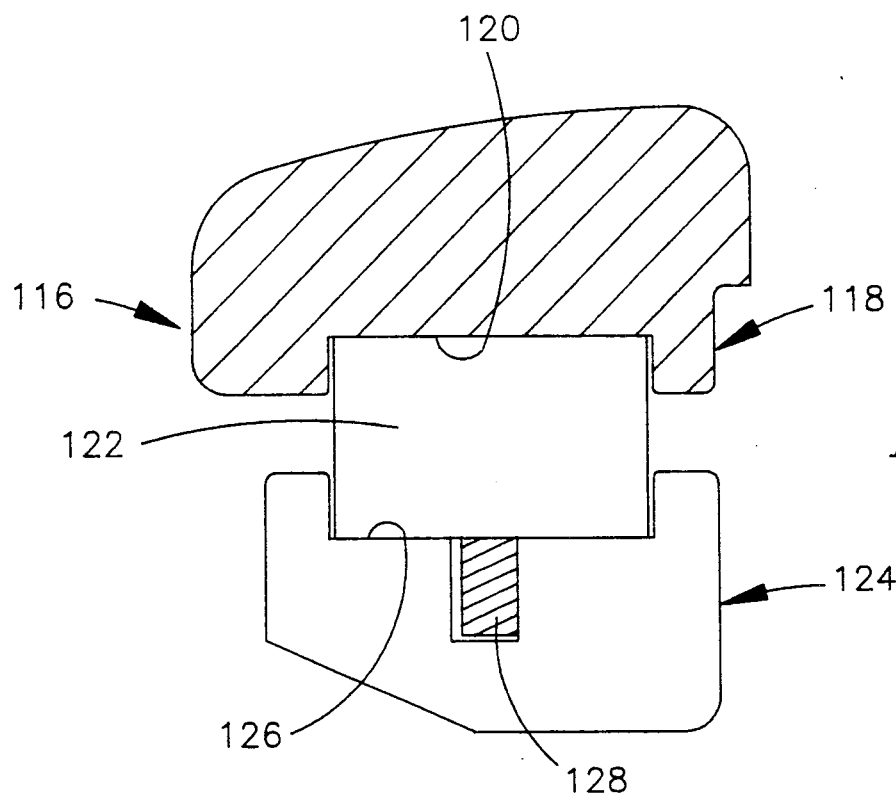
FIG. 6 is a vertical section schematically illustrating a roller bearing assembly manifesting aspects of the invention.
Figure 7:
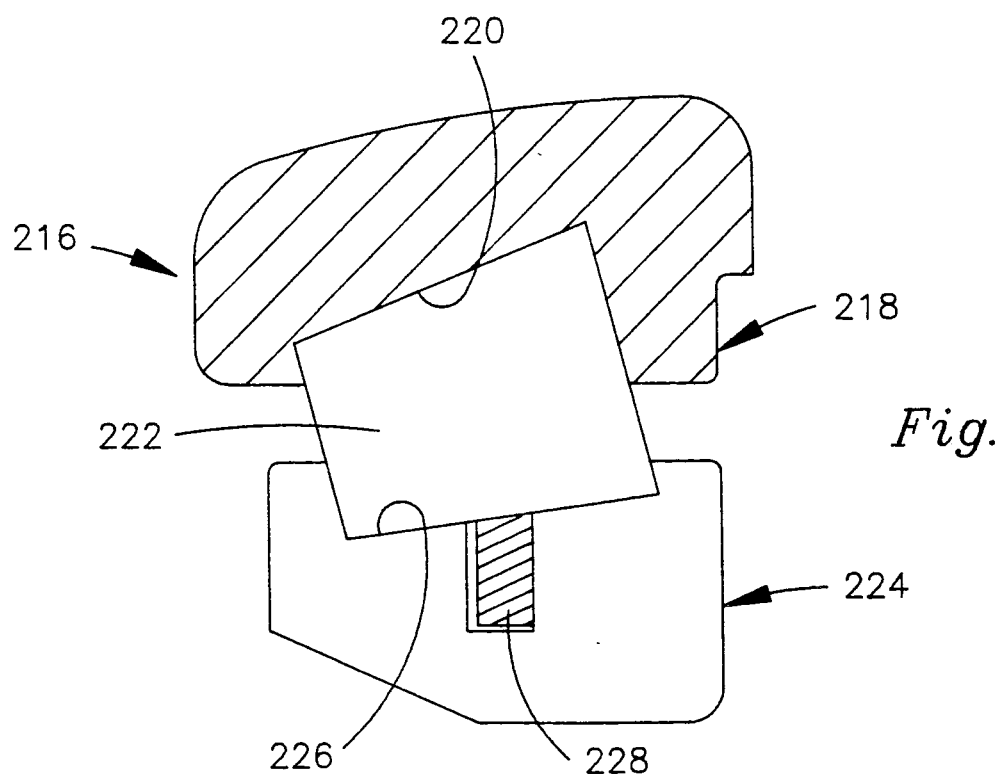
FIG. 7 is a vertical section schematically illustrating a tapered roller bearing assembly manifesting aspects of the invention.

Rotatable bearing elements 22 (122, 222) are typically positioned in a circular array about an axis of rotation denoted A in FIG. 1 (and FIGS. 6 and 7). Outer bearing member 18 (118, 218) and inner bearing member 24 (124, 224) are preferably and typically symmetrical about axis A; outer bearing member 18 (118, 218) and inner bearing member 24 (124, 224) have not been sectioned in FIG. 1 (and FIGS. 6 and 7), for drawing clarity.

In the configuration illustrated in FIG. 1, inwardly facing race surface 20 is a continuous surface, extending annularly entirely around axis A, and is concave with respect to axis A. Similarly, outwardly facing race surface 26 is an annular concave surface extending circumferentially entirely around inner bearing member 24, which in turn extends entirely around axis A.

A ring 28 (128, 228), of solid lubricant material is biased against at least one of the rotatable bearing elements 22 (122, 222). Ring 28 (128, 228) is preferably a carbon graphite material and is formed so that a radially outwardly facing surface 46 of ring 28 (128, 228) contacts at least one and preferably all of the rotatable bearing elements 22 (122, 222). Ring 28 (128, 228) is shown in section in FIG. 1 (and FIGS. 6 and 7) and is shown in greater detail in FIGS. 2 and 3 where the ring shape is clearly visible.

Figure 4:
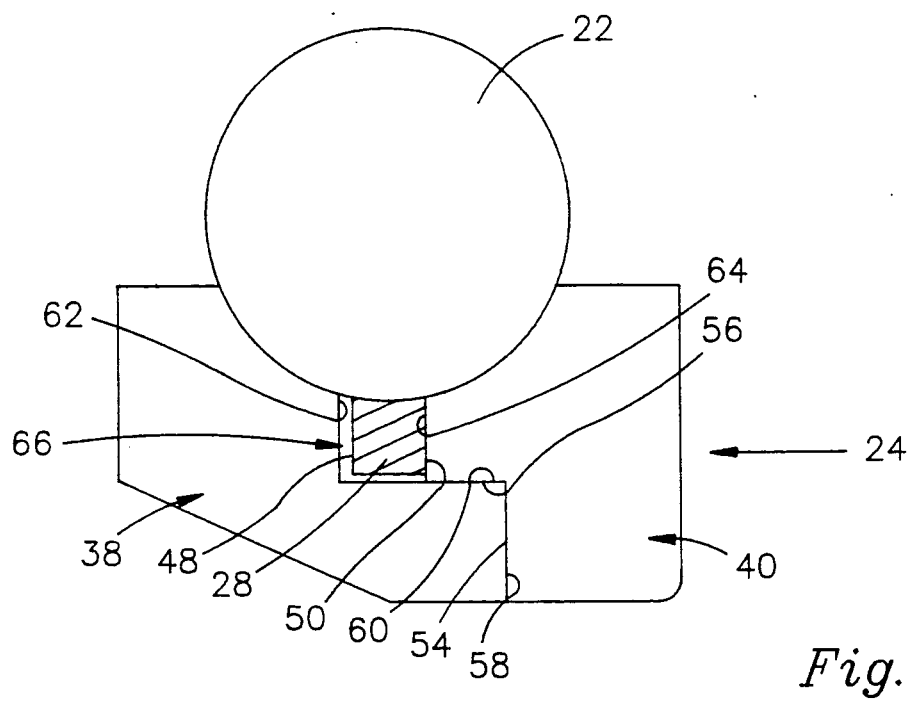
FIG. 4 is an enlarged view of a portion of the structure illustrated in FIG. 1, taken generally at the area denoted by arrow IV in FIG. 1.

Still referring to FIG. 1 (and FIGS. 6 and 7) and also referring to FIG. 4, inner bearing member 24 (124, 224) is formed in two pieces. A first piece 38 is shown in greater detail in FIG. 4 and has a planar land 60 formed therein. A second piece 40 mates with first piece 38 to provide a cavity 66 for residence of ring 28 therewithin.

Bearing assembly 16 (116, 216) is preferably retained in tight contact with wheel 14 by wheel 14 being swaged about outer bearing member 18 (118, 218). Alternatively, inwardly facing race surface 20 (120, 220) may be formed in wheel 14 so that wheel 14 effectively defines outer bearing member 18 (118, 218), i.e. outer bearing member 18 (118, 218) may be an integral part of wheel 14.

Bearing assembly 16 (116, 216) is preferably tightly retained in contact with trolley load-carrying member 12 by inner bearing member 24 (124, 224), being retained in place by swaging an appropriate portion, such as indicated 52 in FIG. 1 (and FIGS. 6 and 7), of trolley load carrying member 12 against inner member 24 (124, 224). Other methods of mechanically retaining bearing assembly 16 (116, 216) in place may also be used. Inner and outer members 24 (124, 224), 18 (118, 218) may also be integrally formed as parts of load carrying member 12 and wheel 14 respectively.

Ring 28 (128, 228),is preferably radially inboard of rotatable members 22 (122, 222), as illustrated in FIG. 1 (and FIGS. 6 and 7). This configuration permits ring 28 (128, 228), to be compressed to a slightly smaller outer diameter when installed in the position illustrated in FIG. 1 (and FIGS. 6 and 7). With ring 28 (128, 228) being so-compressed during installation, when in place ring 28 (128, 228) endeavors to relieve internal stresses by expanding radially outwardly, thereby contacting rotatable bearing elements 22 (122, 222).

Use of compressed ring 28 (128, 228) made of graphite lubricant eliminates the need for any separate device for biasing lubricant material against bearing elements 22 (122, 222). However, the invention is not limited to configurations having ring 28 (128, 228) inboard of rotatable elements 22 (122, 222). Similarly, the invention is not limited to configurations in which ring 28 (128, 228) is within inner bearing member 24 (124, 224), nor is the invention limited to configurations in which the solid lubricant material, of which ring 28 (128, 228) is fabricated, contacts the rotatable bearing elements at a position within one of the race surfaces 20 (120, 220), 26 (126, 226), as illustrated in FIG. 1.

Figure 2:
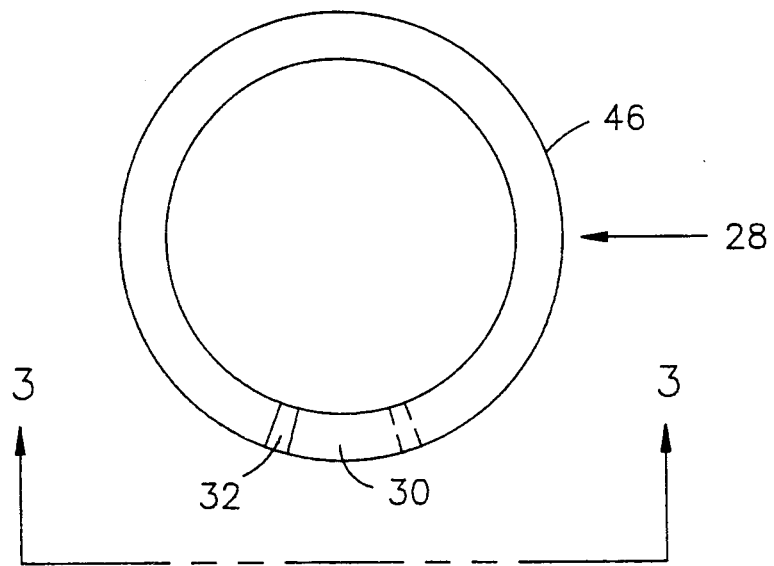
FIG. 2 is a top view of a lubricating ring component of the assembly illustrated in FIG. 1.
Figure 3:
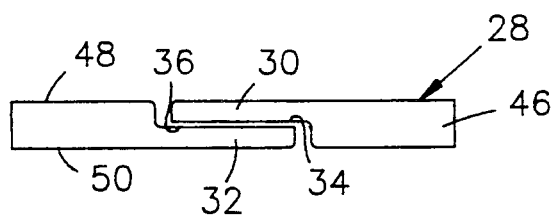
FIG. 3 is side view of the lubricating ring illustrated in FIG. 2, taken in the direction denoted by arrows 3—3 in FIG. 2.

As best shown in FIGS. 2 and 3, ring 28 includes circumferential end portions 30, 32 which overlap one another so that ring 28 is continuous through an angle exceeding 360 degrees when ring 28 is radially uncompressed. Facing preferably planar surfaces 34, 36 of overlapping end portions 30, 32 of ring 28 facilitate sliding contact of end portions 30, 32 along a sector of ring 28 when the ring is radially compressed; this sliding contact occurs between planar surfaces 34, 36 of first and second circumferential end portions 30, 32 respectively. Surfaces 34, 36 are preferably normal to the axis of ring 28 and parallel to one another. Surfaces 34, 36 are also preferably parallel with axially facing annular surfaces 48, 50 of ring 28.

Referring to FIG. 4, the two-piece construction of inner bearing member 24 facilitates easy machining to provide a void, designated 66 in FIG. 4, in which ring 28 resides. Second piece 40 of inner bearing member 24 has a step defined by connecting vertical and horizontal surfaces 54, 56. Similarly, first piece 38 of inner bearing member 24 has a step formed by respective vertical and horizontal surfaces 58 and 60. Vertical and horizontal surfaces 54, 56 of second piece 40 fit complementally flush with corresponding vertical and horizontal surfaces 58, 60 of first piece 38 when the bearing is assembled.

Horizontal surface 60 of first piece 38 is longer (in a direction parallel to the bearing axis of rotation, which is the horizontal direction viewing FIG. 4) than corresponding horizontal surface 56 on second piece 40. This disparity in length results in vertical surface 62 of first piece 38 being laterally displaced from corresponding vertical surface 64 of second piece 40, as illustrated in FIG. 4. Lateral displacement of vertical surface 62 from vertical surface 64 creates void 66 in which ring 28 resides.

While it is desirable that surfaces 62, 64 be vertical and parallel with one another as illustrated in FIG. 4, this is not necessary; surfaces 62, 64 could be formed in a V-shape or some other configuration to house ring 28. However, with ring 28 having generally square or rectangular cross-section as illustrated in FIG. 4, it is desirable to have surfaces 62, 64 substantially parallel and substantially vertical so that when the bearing is assembled, ring 28 can flex radially outwardly to bias itself against rotatable elements 22 without risk of binding between annular axially facing surfaces 48, 50 of ring 28 and surfaces 62, 64 of first and second pieces 38, 40.

During operation the graphite material from which ring 28 (128, 228) is preferably made effectively "writes on" the rotatable elements 22 (122, 222) which ring 28 (128, 228) contacts, in much the manner a pencil writes on paper. This "writing" action leaves a thin lubricating graphite film on rotatable elements 22 (122, 222) contacted by ring 28 (128, 228). As elements 22 (122, 222) rotate and contact race surfaces 20 (120, 220), 26 (126, 226), the lubricating graphite film substantially covers race surfaces 20 (120, 220), 26 (126, 226) and substantially covers remaining portions of the surfaces of rotatable elements 22 (122, 222). In a short time, the lubricating graphite film covers substantially all of rotatable bearing elements 22 (122, 222) as well as substantially the entirety of race surfaces 20 (120, 220), 26(126, 226).

The graphite film, being electrically conductive, facilitates good electrical contact between outer bearing member 18 (118, 218), and rotatable bearing elements 22 (122, 222), and in turn between rotatable bearing elements 22 (122, 222) and inner bearing member 24 (124, 224). Because rail 10, trolley load carrying member 12, wheel 14 and the parts of bearing assembly 16 (116, 216) (other than ring 28 (128, 228)) are generally ferrous metal, presence of the electrically conductive lubricating film between the rotatable bearing elements and the respective inner and outer bearing members creates an electrically conductive path from rail 10 to an article suspended from load carrying member 12. This electrical conductivity property of the bearing assembly permits the bearing assembly to be used advantageously in industrial applications, such as electrostatic spray painting, where it is necessary or desirable to apply a charge to the objects or to discharge the objects being carried by the trolley.

Use of graphite ring 28 (128, 228) to provide lubrication for the bearing assembly 16 (116, 216) eliminates the need for periodic application of petroleum-based lubricants. In using bearing assembly 16 (116, 216), it may be necessary to initially apply a small dose of a petroleum-based lubricant. Necessity for initial lubrication depends on hardness of the graphite employed and speed at which the graphite lubrication member wears and sacrifices itself to form the graphite film on rotatable bearing elements 22 (122, 222) and race surfaces 20 (120, 220), 26 (126, 226) of the inner and outer bearing members. At most, only a small initial application of a petroleum-based lubricant is necessary. Desirably, no re-lubrication is needed over the useful life of the bearing; graphite provided by ring 28 (128, 228) preferably satisfies all further bearing lubrication requirements. Hence, the bearing can be used in severe environments in which shutdown for periodic lubrication is undesirable or unfeasible.

Ring 28 (128, 228) is preferably fabricated slightly oversized and is compressed in void 66 when the bearing is assembled. Lubricant ring 28 (128, 228) then maintains a slight outward force on the rotatable bearing elements 22 (122, 222). This force does not create any objectionable torque in the bearing. As ring 28 (128, 228) wears, it expands and continues to contact balls 22 or rollers 122 or tapered rollers 222 thereby providing lubrication.

The bearing assembly should be protected from rust after assembly; this is normally accomplished by applying a preservative oil or other protective material to the bearing assembly. When the bearing assembly is used in material handling applications requiring an electrically conductive trolley bearing assembly, the protective material desirably should contain free carbon, preferably graphite, to provide the required electrical conductivity as well as start-up lubrication and surface protection against corrosion.

Bearings using the solid, dry lubricant of this invention can operate at temperatures ranging from cryogenic levels up to about 450 degrees Fahrenheit.

The minute amount of dry lubricant material forming the lubricant film between elements 22 (122, 222) and respective race surfaces 20 (120, 220), 26 (126, 226) makes the bearing assembly especially suitable for applications requiring a high degree of cleanliness. The amount of ring 28 sacrificed to form the lubricating film on elements 22 (122, 222) and race surfaces 20 (120, 220), 26 (126, 226) is so small that it is normally not detectable by unaided human eye.

Figure 5:
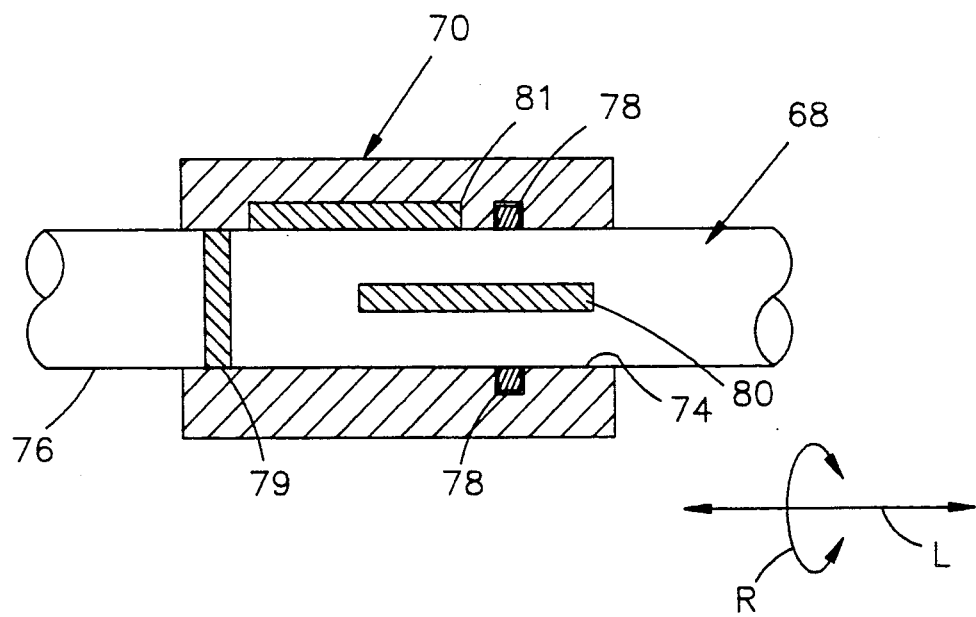
FIG. 5 is a vertical section of a sleeve bearing manifesting aspects of the invention.

Referring to FIG. 5, a sleeve bearing assembly includes a cylindrical inner member 68 journaled within a tubular sleeve 70. Running contact occurs between an inner annular surface 74 of sleeve 70 and an outer circumferential surface 76 of inner member 68. In FIG. 5, although sleeve 70 is sectioned to show the area at which this running contact occurs, running contact need not occur between the entire inner surface of sleeve 70 and inner member 68--inner member 68 or sleeve 70, or both, may have only portions of their axial lengths formed as annular surfaces operating in running contact with each other.

Inner member 68 is preferably cylindrical about its longitudinal axis so that its outer circumferential surface 76 is cylindrical over the portion of its axial length contacting inner surface 74 of sleeve 70. Inner surface 74 of sleeve 70 is also preferably cylindrical over whatever portion of its axial length it contacts outer surface 76 of inner member 68.

Solid lubricant material is positioned either in sleeve 70, at inner surface 74, or in inner member 68, at surface 76, or both. Position of the solid lubricant material depends on relative motion of inner member 68 with respect to sleeve 70. If relative motion of inner member 68 is longitudinal with respect to sleeve 70, in the direction of arrow L in FIG. 5, the lubricant is preferably configured as a ring having its axis parallel to the longitudinal axis of inner member 68.

The lubricant material, when configured as a ring, may be either positioned as ring 78 in sleeve 70 or as ring 79 in inner member 68. Ring 78 or 79 preferably is fabricated with a rectangular or other cross-section so that ring 78 or 79 presents a planar surface to cylindrical surface 76 of inner member 68 or other surface contacted by the ring; the planar surface maximizes the lubricating effect as the ring sacrifices itself and assures that the ring wears in an at least somewhat optimal, self-seating fashion.

If the lubricant is configured as ring 78 and is located in sleeve 70 as shown, ring 78 is preferably fabricated with its inner diameter (facing inner member 68) slightly smaller than the outer diameter of inner member 68, so that to be installed, ring 78 must be slightly enlarged. In such case, once installed, ring 78 seeks to return to its unstressed, smaller diameter and thereby contact inner member 68. If the lubricating ring is configured as ring 79 and is located in inner member 68, then ring 79 should be fabricated with its outer diameter slightly larger than the inner diameter of sleeve 70 at inner annular surface 74, so that when compressed in place, ring 79 seeks to return to its unstressed state and expands to contact the inner surface of sleeve 70 to apply a lubricating film to the interior of sleeve 70 at surface 74 as the bearing operates.

If motion of inner member 68 is only rotational about its axis, as indicated by arrow R in FIG. 5, the lubricant is preferably configured as an axially elongated strip, extending axially over the length of running contact between the contacting annular bearing surfaces of sleeve 70 and inner member 68. One preferred configuration is illustrated by strip 80 mounted in inner member 68 and extending the axial length of the area of running rotational contact with sleeve 70. In such case, strip 80 is preferably parallel to the longitudinal axis of inner member 68; however this is not required. Alternatively, the lubricant strip may, in the situation where relative motion of inner member with respect to sleeve 70 is only rotational, be positioned in the wall of sleeve 70, as exemplified by strip 81. In either case, where the lubricant material is disposed as a strip, in either inner member 68 or in sleeve 70 (or even in both), some means, such a spring or compressed resilient plastic, is desirably provided to bias the strip to contact the moving surface.

As with the first embodiment, the preferred lubricant material is graphite. When graphite is used, the bearing may be made electrically conductive.

The invention also embraces embodiments where the solid lubricant material is a combination of rings and strips and where the solid lubricant other geometric configurations. In all cases, the solid lubricant material forms a lubricant film along the surface the lubricant abuts, with the film then being carried to other parts of the bearing assembly as the bearing operates and the lubricating member sacrifices itself. In all cases lubricant material is biased against a moving surface; when the lubricant material is configured as a ring, this may be accomplished by self bias, by placing the lubricant in compression or in tension, depending on configuration of the solid lubricant material.

The presently preferred material for the lubricant is compressed carbon, including only enough binder to hold the solid lubricant member together to retain its shape. A small, suitable amount of a second solid lubricant additive material can also be included, as needed for a particular application; a preferred second lubricant material used as a lubricant additive is molybdenum disulfide. However, it is to be understood that the presently preferred material is compressed carbon, with binder material added only in the amount required to maintain the structural integrity of the lubricant member as it sacrifices itself to provide the lubricant film for the bearing assemblies of the invention.

With respect to other candidate materials for the solid lubricant member, in addition to graphite fiber reinforced polyimides and graphite filled polyimide, other new lubricating solids are being synthesized and evaluated; the most promising of these solids are incorporated into graphite-type chemical compositions which may be suitable for use in the bearing assemblies of the invention. An example of a specific compound used is $Cs_2MoOS_3$ which has exceptional thermal stability approaching 1650° F. The molybdate structure forms in-situ protective films o a wide variety of different surfaces and appears to be highly suitable for use in bearing assemblies manifesting the invention.

We claim:

1. A solid-lubricated bearing assembly comprising:
   a. an outer bearing member having a generally radially inwardly facing race surface formed therein adapted to receive rotatable bearing elements for rotating motion of said rotatable bearing elements respecting said outer bearing member;
   b. an inner bearing member having a generally radially outwardly facing race surface formed therein adapted to receive said rotatable bearing elements for rotating motion of said rotatable bearing elements respecting said inner bearing member;
   a plurality of said rotatable bearing elements retained between said race surfaces of said inner and outer bearing members;
   d. solid lubricant material internally self-biased against and contacting at least one of said rotatable bearing elements for depositing a film of said solid lubricant material on said rotatable element by contact therewith as said rotatable elements rotate against said race surfaces.

2. The bearing assembly of claim 1 wherein said solid lubricant material contacts substantially all of said rotatable bearing elements.

3. The bearing assembly of claim 1 wherein said solid lubricant material is a ring.

4. The bearing assembly of claim 3 wherein said solid lubricant material is in the form of a ring and is radially inward of said rotatable elements.

5. The bearing assembly of claim 4 wherein said ring is inwardly compressed by said rotatable bearing elements.

6. The bearing of claim 3 wherein surfaces of said ring perpendicular to the axis of said ring are normal to a surface portion of said ring which contacts said rotating elements.

7. The bearing assembly of claim 1 further comprising means for biasing said solid lubricating material against said rotatable bearing elements.

8. The bearing assembly of claim 1 wherein said outer bearing member is in the form of a ring.

9. The bearing assembly of claim 8 wherein said inner bearing member is in the form of a ring.

10. The bearing assembly of claim 1 wherein said race surfaces are annular.

11. The bearing assembly of claim 1 wherein said elements are balls.

12. The bearing assembly of claim 1 wherein said elements are rollers.

13. The bearing assembly of claim 12 wherein said rollers are tapered.

14. The bearing assembly of claim 1 wherein the assembly is electrically conductive.

15. The bearing assembly of claim 14 wherein the solid lubricant comprises graphite.

16. A solid-lubricated bearing assembly comprising:
   a. an outer bearing member having a generally radially inwardly facing race surface formed therein adapted to receive rotatable bearing elements for rotating motion of said rotatable bearing elements respecting said outer bearing member;
   b. an inner bearing member having a generally radially outwardly facing race surface formed therein adapted to receive said rotatable bearing elements for rotating motion of said rotatable bearing elements respecting said inner bearing member;
   c. a plurality of said rotatable bearing elements retained between said race surfaces of said inner and outer bearing members;
   d. ring of solid lubricant material located radially inwardly of said bearing elements, said ring being inwardly compressed by contact with at least one of said elements, for depositing a film of said solid lubricant material on said element by contact therewith as said rotatable element moves relative to said race surfaces. wherein said ring when uncompressed is discontinuous around its circumference.

17. The bearing assembly of claim 16 wherein said ring includes circumferential end portions overlapping one another so that said ring is continuous through an angle exceeding three hundred sixty degrees when uncompressed, wherein said end portions of said ring overlap one another for sliding contact along a sector of said ring at facing surfaces of said end portions when said ring is radially compressed.

18. The bearing assembly of claim 16 wherein said facing surfaces of said ring are planar.

19. The bearing assembly of claim 18 wherein said planar surfaces are normal to the axis of said ring.

20. The bearing assembly of claim 19 wherein said lubricating ring is housed within said inner bearing member.

21. The bearing assembly of claim 20 wherein said facing surfaces of said ring are substantially parallel and co-planar when in sliding contact with one another.

22. The bearing assembly of claim 21 wherein said facing surfaces of said end portions which are in sliding contact with one another are substantially parallel with axial surfaces of said ring.

23. The bearing assembly of claim 22 wherein said facing surfaces are substantially normal to said rotatable bearing elements.

24. The bearing assembly of claim 23 wherein the radially inner surface of said ring is parallel tot he axis of said ring.

25. The bearing assembly of claim 23 wherein the radially outer surface of said ring is parallel to the axis of said ring.

26. A solid-lubricated bearing assembly comprising:
 a. an outer bearing member having a generally radially inwardly facing race surface formed therein adapted to receive rotatable bearing elements for rotating motion of said rotatable bearing elements respecting said outer bearing member;
 b. an inner bearing member having a generally radially outwardly facing race surface formed therein adapted to receive said rotatable bearing elements for rotating motion of said rotatable bearing elements respecting said inner bearing member;
 c. a plurality of said rotatable bearing elements retained between said race surfaces of said inner and outer bearing members;
 d. a ring of solid lubricant material biased against and contacting at least one of said rotatable bearing elements for depositing a film of said solid lubricant material on said rotatable element by contact therewith as said rotatable elements rotate against said race surfaces. wherein said inner bearing member has two pieces, one piece having a land for contacting the radially inner surface of said lubricating ring, said land being parallel to a line of tangency at a point of rotating element-lubricating ring contact.

27. The bearing of claim 22 wherein said land is planar and parallel to the axis of said ring.

28. A solid-lubricating bearing assembly comprising:
 a. first means for retaining a plurality of rotatable bearing elements in a generally circular array and permitting rotary motion of said elements relative to said first means, at least about respective individual axes which are parallel with an axis of said circular array;
 b. second means for retaining said plurality of rotatable bearing elements in said generally circular array and permitting rotating motion of said elements between and relative to said first and second means, at least about respective individual axes which are parallel with the axis of said circular array;
 c. solid lubricant material self-biased against at least one of said elements for depositing a film of said material on said first means, second means and said elements by contact thereamong as said element having said lubricant material biased thereagainst moves relative to said first and second means and remaining ones of said elements
wherein:
 d. said plurality of elements rotate relative to said first and second means when there is relative rotary motion between said first and second means.

29. In a bearing assembly including:
 a. an outer member having a generally radially inwardly facing race surface formed therein to receive rotatable bearing elements for rotating motion of said rotatable bearing elements respecting said outer bearing member, and
 b. an inner bearing member having a generally radially outwardly facing race surface formed therein to receive said rotatable bearing elements for rotating motion of said rotatable bearing elements respecting said inner bearing member and a plurality of said rotatable bearing elements retained between said race surfaces of said inner and outer bearing members;

the improvement comprising:
 c. solid lubricant material self-biased against at least one of said inwardly facing race surface, said outwardly facing race surface or one of said rotatable bearing elements, for depositing a film of said lubricant thereon by contact therewith as said rotatable elements rotate against said race surfaces of said outer and inner members and said outer and inner members rotate respecting one another.

30. An solid-lubricated bearing assembly comprising:
 e. an outer bearing member in the form of a ring, having a generally radially inwardly facing annular race surface formed therein adapted to receive rotatable bearing balls for rotating motion of said rotatable bearing balls respecting said outer bearing member;
 f. an inner bearing member in the form of a ring, having a generally radially outwardly facing annular race surface formed therein adapted to receive said rotatable bearing balls for rotating motion of said balls respecting said inner bearing member;
 g. said balls being retained between said race surfaces of said inner and outer bearing members;
 h. a ring of solid lubricant material biased against and contacting substantially all of said rotatable bearing balls, for depositing a film of said solid lubricant material on said rotatable balls by contact therewith as said balls rotate against said race surfaces of said outer and inner members;
  i. said ring being located radially inwardly of said balls and being inwardly compressed by said rotatable bearing balls;
  ii. said ring when compressed being essentially continuous around its circumference and including circumferential end portions overlapping one another so that said ring is continuous through an angle exceeding three hundred sixty degrees when uncompressed;
  iii. end portions of said ring overlapping one another for sliding contact along a sector of said ring at respective facing surfaces when said ring is radially compressed;
  iv. axially facing surfaces of said ring being planar and normal to the axis of said ring;
  v. said lubricating ring being housed within said inner bearing member;
  vi. said facing surfaces of said end portions which are in sliding contact with one another being substantially planar;
  vii. said facing surfaces of said end portions which are in sliding contact with one another being substantially parallel with said annular surfaces;
  viii. said facing surfaces of said end portions being substantially normal to said rotatable bearing balls;
  ix. surfaces of said ring perpendicular to the axis of said ring being normal to a surface portion of said ring contacting said rotating balls;
 i. means for biasing said solid lubricating material against said rotatable bearing balls;
 j. said inner bearing member having two pieces, one piece having a land for supporting said lubricating ring in the radially inward direction as required, said land being parallel to a line of tangency at rotating element-lubricating ring contact.

* * * * *